United States Patent [19]
Viaud

[11] Patent Number: 5,311,729
[45] Date of Patent: May 17, 1994

[54] WRAPPING MECHANISM FOR THE BALES OF A BALER

[75] Inventor: Jean Viaud, Sarreguemines, France

[73] Assignee: Deere & Company, Moline, Ill.

[21] Appl. No.: 742,679

[22] Filed: Aug. 8, 1991

[30] Foreign Application Priority Data

Oct. 16, 1990 [DE] Fed. Rep. of Germany ....... 4032763

[51] Int. Cl.$^5$ .............................................. A01F 15/07
[52] U.S. Cl. ...................................... 56/341; 100/88; 242/75.45
[58] Field of Search ..................... 56/341; 100/88, 5; 242/55.2, 55.53, 74.45, 156.1

[56] References Cited

U.S. PATENT DOCUMENTS

| | | | |
|---|---|---|---|
| 3,792,574 | 2/1974 | Best | 56/341 |
| 4,366,665 | 1/1983 | VanGinhoven | 56/341 |
| 4,407,113 | 10/1983 | Core | 56/341 |
| 4,514,969 | 5/1985 | Moosbrucker et al. | 56/341 |
| 4,580,398 | 4/1986 | Bruer et al. | 100/5 X |
| 4,941,311 | 7/1990 | Ardueser et al. | 242/55.53 X |
| 4,956,960 | 9/1990 | Antsey et al. | 242/55.2 X |
| 4,956,968 | 9/1990 | Underhill | 56/341 |

FOREIGN PATENT DOCUMENTS 0331653 9/1989 European Pat. Off.
8321610 3/1986 Fed. Rep. of Germany.

Primary Examiner—George A. Suchfield

[57] ABSTRACT

A supply of wrapping material for a wrapping mechanism is provided in the form of a spool having a core member which is rotatably mounted to the lower ends of a pair of support arms having their upper ends vertically pivotally mounted to an arm support for pivoting about a horizontal axis. An upright contact surface is located below the horizontal axis and is engaged by one side of the spool of material such that the surface offers frictional resistance to the unwrapping of material from the spool. In order to keep this frictional resistance substantially constant through out the unwrapping of material from and consequent loss of weight of the spool, a biasing spring may be connected between the arm support and at least one of the arms and/or the surface can be configured or coated with frictional material such that the coefficient of friction of the surface increases in a direction away from the horizontal axis, this being the direction that the zone of contact between the spool and the surface travels as wrapping material is pulled from the spool during wrapping operation.

3 Claims, 2 Drawing Sheets

WRAPPING MECHANISM FOR THE BALES OF A BALER

ASSIGNMENT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 0 61265, U.S.A., together with all rights to file, and to claim priorities in connection with, corresponding patent applications in any and all foreign countries in the name of Deere & Company or otherwise.

BACKGROUND OF THE INVENTION

The present invention relates to mechanisms for wrapping bales formed in a baler, and more particularly relates to such mechanisms that include a roll of wrapping material stored upon a rotating spool.

Material formed into bales in a baler, in particular crop (such as hay, straw) or industrial material (paper, cotton, rags or the like), is surrounded with wrapping material and after the baling process, so that the shape imposed by the baler is maintained and remains compacted during any later handling. The wrapping material so spooled may be plastic film, plastic mesh, paper or the like, which is rolled onto a spool and inserted into the wrapping mechanism.

Thus, U.S. Pat. No. 4,366,665 discloses a wrapping mechanism including a spool of plastic film on a carrier as a supply. When required, a length of the plastic film is pulled from the spool and moved by a conveying arrangement to the baling chamber where it is moved along by the rotating bale of material and encloses its circumference as a result. After the bale has been wrapped with at least one layer of wrapping material, the wrapped length of wrapping material is cut from the spool by a cutter arrangement. In order to avoid any overrunning by the spool due to its rotational inertia and the consequent unwanted unrolling of wrapping material from the spool, a brake device including a brake disk, springs and brake lining, is provided for opposing the rotation of the spool. The provision of such a brake is considered a disadvantage since added costs are incurred.

SUMMARY OF THE INVENTION

According to the present invention, there is provided a bale wrapping mechanism which avoids the aforementioned disadvantage associated with the provision a brake in conjunction with a spool of wrap material.

It is an object or feature of the invention to provide a wrapping mechanism wherein the mounting of the spool is such as to result in a braking force being exerted on the spool itself. This feature or object is accomplished by mounting the spool of wrapping material to a pair of support arms which are vertically pivotally mounted at a location such that the weight of the spool of material holds the same against a wall so as to produce a frictional braking force.

A further object or feature of the invention is to provide a mounting for the spool of wrap material which results in the frictional force between the spool of wrap material and the surface against which it bears remaining substantially constant as the spool of material is being depleted, as a consequence of being wrapped around bales during the baling operation, and hence decreasing in weight. This feature or object is accomplished in accordance with one embodiment of the invention, by the use of supplementary force applying device such as a energy storage device in the form of a compression or tension spring, for example, which is connected so as to increase the supplementary force urging the spool against the surface as the spool diminishes in diameter and weight. In accordance with another embodiment of the invention, the feature or object of achieving a substantially constant frictional contact between the spool and the surface it engages is accomplished by varying the coefficient of friction of the surface, so that it increases in the direction of movement of the zone of contact of the spool with the surface as the diameter of the spool diminishes. This varying of the coefficient of friction of the surface is done by either altering the shape of the surface or by coating the surface with substances having different coefficients of friction.

These and other features and objects of the invention will become apparent by reading the ensuing description together with the appended drawings.

DESCRIPTION OF THE PREFERRED EMBODIMENT

Figure 1:
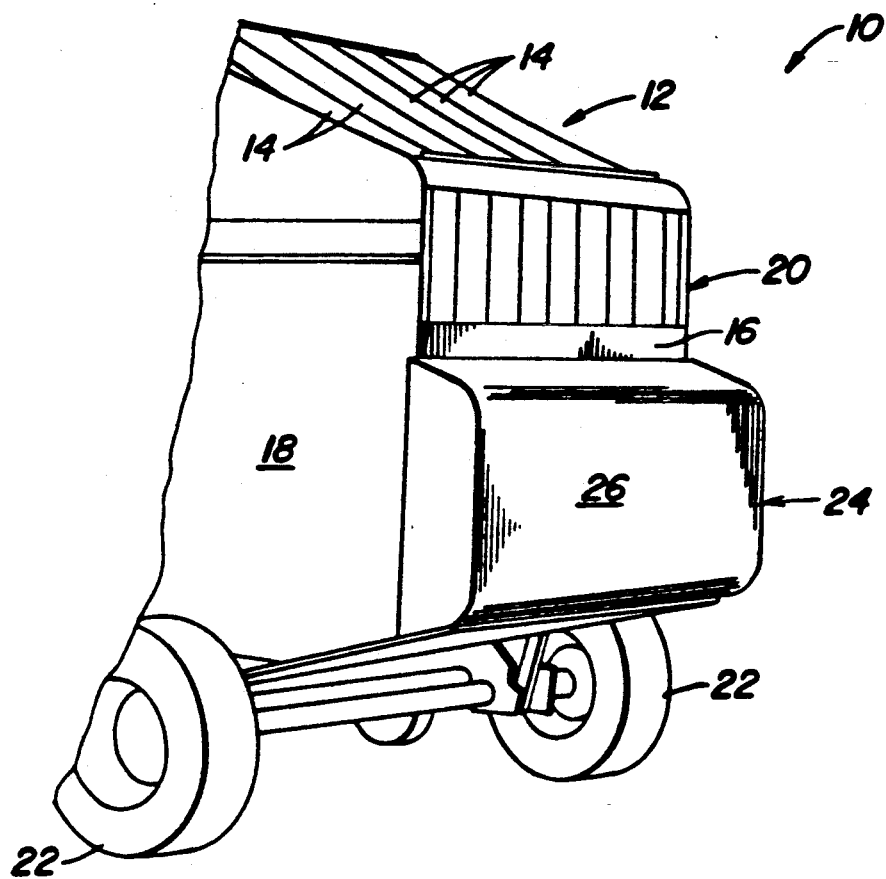
FIG. 1 is a left rear perspective view of a large round baler equipped with a bale wrapping mechanism of the type with which the present invention is particularly suited for use.

Referring now to FIG. 1, there is shown a round baler 10 having a baling chamber 12 that is bounded at other than its opposite sides by a plurality of belts 14. At the rear, as shown to the right in FIG. 1, the belts 14 are covered by a vertical wall 16, while the baling chamber 12 is enclosed at its sides by walls 18 and 20. The baler 10 is supported by wheels 22 that permit movement over the ground, and includes a wrapping mechanism 24 at its rear, adjacent to the wall 16, whose individual components are illustrated in FIG. 2.

Such a baler 10 is used to take up crop deposited on the ground and to compact it into bales in the baling chamber, in order to make the crop easy to handle for any further use. After the crop has been compacted in the baling chamber 12, it is wrapped and deposited on the ground.

The configuration of the baler 10 as a mobile round baler represents only one possible variation. For example, instead of crop the baler could also compact industrial materials such as paper, rags, cotton, excelsior or the like, in which case the baler may be a stationary device.

Figure 2:
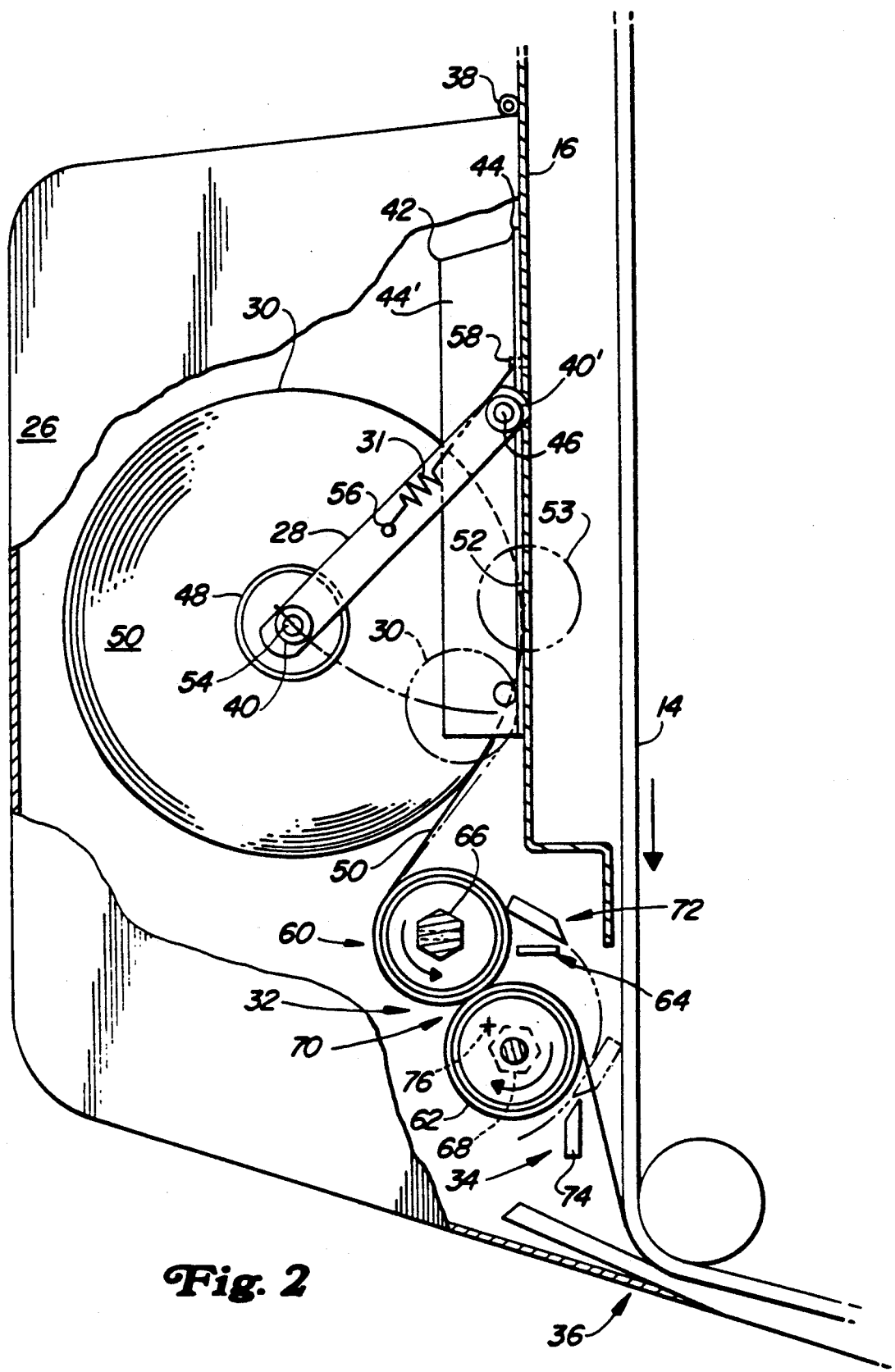
FIG. 2 is a right side elevational view of the wrapping mechanism showing the spool or wrap material in solid lines in an unused condition and showing the spool in dashed lines in a spent condition.

Referring now to FIG. 2, it can be seen that the wrapping mechanism 24 is enclosed by a box 26 and includes at least arms 28, a spool 30, an energy storage device 31, a conveying arrangement 32, a cutter arrangement 34 and a guide track 36.

The box 26 is attached to the wall 16 by a hinge 38 so as to pivot vertically, and protects the entire wrapping mechanism 24 from dirt and external influences.

The arms 28 are in the form of straps having a length that exceeds the largest possible radius of a spool of material to be supported by the arms by approximately one quarter of such radius. Upper and lower ends of the arms 28 are respectively provided with bearings 40' and 40, to permit an attachment of the arms so that they are free to pivot at their upper ends and so that the spool 30 is free to rotate. An angle iron 42 is provided for the attachment of each of the arms 28 at the wall 16, with one leg 44 being fastened to the wall 16 and with the other leg 44, accepting the bearing 40'; for this purpose a bearing pin 46 extends perpendicular to the plane of the drawing from the leg 44'. As can be seen, the arms 28 can pivot in the plane of the drawing about the bearing pins 46.

In this case, the spool 30 consists of a carrier 48 and wrapping material 50 having a partial region of its circumference in contact with a surface 52 of the wall 16. FIG. 2 shows the spool 30 in solid lines in a first end or left-most position, which it occupies when the spool 30 includes its entire supply of wrapping material, and shows the spool 30 in broken lines in a second end or right-most position, which it occupies when the wrapping material is completely used or spent. The carrier 48 may consist of a pipe of cardboard, plastic or metal at whose ends journals 54 are attached to engage the bearings 40.

Figure 3:
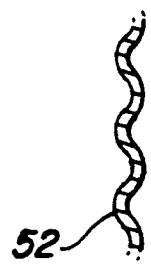
FIG. 3 is an enlargement of the circled area appearing in FIG. 2.

The wrapping material 50 is spooled onto the carrier 48 and is used to wrap the bale that is formed in the baling chamber 12. The wrapping material 50 may be plastic film, mesh, paper or the like, as is already well known. While the wrapping material 50 is conducted through the guide track 36 to the baling chamber 12, and there carried along by a rotating bale, the spool 30 rotates with the journals 54 of the carrier 48 in the bearing 40, while its outer diameter decreases steadily. As a result of the reduction in outer diameter, the distance between the axis of rotation of the spool 30 and the wall 16 is reduced, and the spool 30 with the arms 28 pivot about the bearing pins 46 and its zone of contact with the surface 52 of the wall 16 moves downwardly. The surface 52 may be painted sheet metal or may be provided with a coating of rubber or the like, which exhibits a high coefficient of friction. Alternatively, the surface 52 may be with waves, as can be seen in FIG. 3, which is an enlargement by the factor of two of the area located in FIG. 2 in the circle 53. Finally the surface 52 may be provided with various different coatings, that come into contact with the spool 30 depending on its changing position along the surface. As can be seen in FIG. 2, the region of contact of the spool 30 with the surface 52 moves downward as its outside diameter decreases. Accordingly, a friction coating with a higher coefficient of friction at a lower location of the surface 52 can equalize the friction force reduction caused by the consumption of the spool 30.

In this embodiment, the energy storage device 31 is formed by mechanical tension springs, that are each attached at one end to a pin 56 in a respective one of the arms 28, and at the other end to a pin 58 in a respective one of the angle irons 42. The position of the pins 56, 58 is such that they are located on a straight line with the bearing pin 46, when the spool 30 is at an intermediate position between its first end position and its second end position. In this intermediate position, that also represents a dead center position, the energy storage device is under its greatest tension. The farther the arms 28 are moved from the intermediate position, the greater is the distance from an imaginary line through the pins 56,58 to the center of the bearing pin 46, and therewith the lever arm through which the energy storage device 31 acts upon the arms 28.

As can be seen, after passing the intermediate position in a counter clockwise direction, the energy storage device 31 tends to shorten and thereby forces the spool 30 with the binding material on it against the surface 52. After passing the intermediate position in the clockwise direction, the energy storage device 31 also shortens, but in that position it lifts the spool 30 and thereby reduces the contact pressure of the wrapping material 50 on the surface 52. Accordingly, a balance is created to either side of the intermediate position in the friction force due to the weight of the spool 30 by the springs 31.

In this embodiment the conveying arrangement 32 consists of an upper and a lower roller 60 and 62 between which the binding material 50 is carried, and a guide vane 64.

The upper roller 60 is coated with rubber on its outer circumference, and hence exhibits a high coefficient of friction on its circumferential surface. The upper roller 60 is driven in the direction of the arrow by a drive arrangement, not shown, as is well known, and for this purpose it is attached rigidly to a shaft 66.

The lower roller 62 is also supported on a shaft 68 in the walls 18, but free to rotate, and is usually not driven, but rotates due to the friction exerted upon it by the upper roller 60. The circumferential surface of the lower roller 62 is smooth over nearly its entire surface, so that the lower roller 62 can be made from metal or a hard plastic. If desired, the lower roller 62 may be driven, in particular at a higher circumferential speed than the upper roller 60. Finally, the axial end regions of the lower roller 62 is provided with helical grooves, not shown, that stretch the wrapping material 50 towards the axial ends of the rollers 60, 62 during their rotational motion. The two rollers 60, 62 define between them a bite or passage 70 through which the wrapping material 50 is conducted.

The arrangement of the rollers 60,62 is so designed that a line through the passage 70 along a common tangent to the rollers 60, 62 is generally perpendicular to the principal plane of the belts 14 or even at an upward angle to the plane of the belts 14. The distance of the rollers 60,62 to the principal plane of the belts 14 is selected so that the wrapping material 50 comes into contact with the belts 14 easily and immediately after leaving the passage 70, and is pulled along by these as soon as it is pulled from the carrier 48 by the rotation of the rollers 60, 62. If the lower roller 62 is driven at a higher circumferential speed than the upper roller 60, the wrapping material 50 is moved upwardly from the tangential plane due to the speed difference.

The guide vane 64 is arranged above the tangent through the passage 70 and approximately parallel to it, where the vanes extend approximately vertically to the principal plane of the belts 14 in their adjoining region. In this way the wrapping material 50 slides along the underside of the guide vane 64 after leaving the passage 70, is guided to the belts 14 and finally comes into contact with the latter. Therefore, state of the art techniques to force the wrapping material 50 against the belts 14, by means of compressed air or other mechanical devices, are unnecessary, since the wrapping material 50 is brought into contact with the belts 14 by the rollers 60, 62 themselves.

The cutter arrangement 34 contains a knife 72 and a counter knife 74 and is used to separate wrapping material 50 wound around the bale from wrapping material remaining on the carrier 30 as soon as the bale is bound sufficiently. The cutter arrangement 34 is in the immediate neighborhood of the conveying arrangement 32 and is operated either automatically or manually. The length and principal orientation of the knife 72 and counter knife 74 correspond to that of the rollers 60, 62.

The knife 72 is configured as a casting with a cutting edge arranged at its lower side, and is supported by a carrier, not shown, so as to pivot about a pivot point 76. This pivoting occurs in the space between the rollers 60, 62 and the belts 14. During this movement, the knife 72 crosses the binding material 50 that extends up to the belts 14 and makes contact with it. In this preferred embodiment, the knife 72 occupies a rest position above the passage 70 and in the vicinity of the upper roller 60, and then moves into a cutting position located below the passage 70 in the lower region of the lower roller 62.

The counter knife 74 is stationary and is attached to the walls 16–20, by means not shown. It also is in the form of a casting with a cutting edge, arranged at its upper side, towards the knife 72. During the cutting, shearing or separating process, the two cutting edges of the knives 72 and 74 slide past each other.

According to the foregoing, the cutting operation of the wrapping material 50 proceeds as follows: Upon a manual or automatic signal, the knife 72 moves on its carrier through a circle arc about a pivot point 76 from its rest position downward to the cutting position. During this movement, the knife 72 encounters the wrapping material 50 shortly before reaching the counter knife 74, which material extends to the belts 14 and is stretched around the lower roller 62, and which has been drawn by the bale rotating in the baling chamber 12 into the guide track 36. During the further course of the operation, the wrapping material 50 is drawn towards the counter knife 74 and sheared off between the two cutting edges respectively of the knives 72 and 74. The sheared end of the wrapping material 50 is drawn by the bale into the baling chamber 12 and there wrapped completely around the bale. After the cutting operation, no additional pull is exerted on the wrapping material 50 remaining on the spool 30, and the upper roller 60 is no longer driven. Accordingly, the unspooling of the binding material 50 from the spool 30 ends immediately after the cutting operation. In particular the spool 30 is stopped from any overrunning by its contact with the surface 52.

I claim:

1. In a wrapping mechanism for feeding wrap material from a spool of wrap material into a baling chamber of a large round baler for wrapping a bale formed in said baling chamber, an improved mounting for the spool comprising: a pair of parallel, spaced apart arms located at opposite ends of the spool and having first ends vertically pivotally mounted to an arm support for swinging about a horizontal pivot axis and having second ends respectively connected to the opposite ends of the spool so as to permit the latter to freely rotate about a rotation axis extending parallel to the pivot axis; and an upright surface being located beneath said first axis and being disposed in constant contact with said spool, whereby the weight of the spool and arms act as a force biasing the spool against said surface.

2. The wrapping mechanism defined in claim 1 and further including at least one spring having a first end connected to said arm support at a location above said pivot axis and having a second end connected to one of said arms and said spring being so located relative to said pivot axis that said spring moves over said pivot axis at an intermediate position assumed by the arms, which is between a first end position assumed by the arms when the spool contains a maximum amount of wrapping material and a second end position which the arms assume when the wrapping material is all used, whereby the spring lifts on the arms during their movement from said first position to said intermediate position and biases the arms in the direction of said surface during their movement from said intermediate position to said second end position.

3. The wrapping mechanism defined in claim 1 wherein said surface is wavy.

* * * * *